United States Patent [19]

Schmuck et al.

[11] Patent Number: 5,741,390
[45] Date of Patent: Apr. 21, 1998

[54] SOUND-INSULATING VEHICLE BODY PART

[75] Inventors: Jean-Claude Schmuck, Camerel; Claude Jeannot, Poissy; Claude Buisson, Hemorine, all of France

[73] Assignee: Rieter Automotive (International) AG, Zollikon, Switzerland

[21] Appl. No.: 474,121

[22] Filed: Jun. 7, 1995

Related U.S. Application Data

[62] Division of Ser. No. 200,538, Feb. 22, 1994, Pat. No. 5,567,922, which is a continuation of Ser. No. 873,832, Apr. 27, 1992, abandoned.

[30] Foreign Application Priority Data

Apr. 26, 1991 [CH] Switzerland ............... 1265/91

[51] Int. Cl.$^6$ ............... B32B 31/22; E04B 1/82
[52] U.S. Cl. ............... 156/280; 156/71; 156/278; 181/290
[58] Field of Search ............... 156/71, 256, 278, 156/280, 290; 181/286, 288, 290, 291; 428/172, 290

[56] References Cited

U.S. PATENT DOCUMENTS

| | | |
|---|---|---|
| 3,615,961 | 10/1971 | Meyer ............... 181/296 |
| 4,131,664 | 12/1978 | Flowers ............... 156/285 |
| 4,242,398 | 12/1980 | Segawa ............... 181/290 |
| 4,456,092 | 6/1984 | Kubozuka et al. . |
| 4,479,992 | 10/1984 | Haeseker ............... 181/288 |
| 4,715,473 | 12/1987 | Tschudin-Mahrer ............... 181/286 |
| 4,782,913 | 11/1988 | Hoffmann ............... 181/286 |
| 4,966,799 | 10/1990 | Lucca ............... 181/290 |

FOREIGN PATENT DOCUMENTS

| | | |
|---|---|---|
| 0 244 755 | 11/1987 | European Pat. Off. . |
| 0 262 092 | 3/1988 | European Pat. Off. . |
| 0 111 430 | 8/1986 | France . |
| 25 10 607 | 9/1975 | Germany . |
| 25 10607 | 9/1975 | Germany . |
| 55-104528 | 8/1980 | Japan . |
| 944 443 | 12/1963 | United Kingdom . |

OTHER PUBLICATIONS

Patent Abstracts of Japan, vol. 10, No. 167 (M–488) (2223) Jun. 13, 1986.
European Search Report Dated Aug. 5, 1992.

*Primary Examiner*—Daniel Stemmer
*Attorney, Agent, or Firm*—Wigman, Cohen, Leitner & Myers, P.C.

[57] ABSTRACT

A method for the production of an inherently stable self-supporting composite part for engine hoods for acoustic screening of noises. A prefabricated outer membrane blank part is cut and trimmed to form an outside sheet. This outside sheet is bonded to a prefabricated inside packing to form a self-supporting structure independent of the engine hood. The inside packing is provided with fastener elements and a removable protective film attached to an exposed surface of the packing. A primer is applied to the outside sheet of the self-supporting structure. A lacquer is applied to the primer and the protective film is removed.

1 Claim, 2 Drawing Sheets

ABSTRACT
SOUND-INSULATING VEHICLE BODY PART

This is a Divisional application of Ser. No. 08/200,538, filed Feb. 22, 1994, now U.S. Pat. No. 5,567,922 which is File-Wrapper Continuation of Ser. No. 07/873,832, filed Apr. 27, 1992, now abandoned.

BACKGROUND OF THE INVENTION

1. Field of the Invention

The present invention relates to an inherently stable composite part for screening noise from automobile engines or the like. More particularly, the present invention is related to improved sound deadening plastic composite element with inner packing for an engine hood. Composite parts of this type are used primarily in the automobile industry and in auto bodies, particularly as engine hoods.

The automobile industry is becoming increasingly interested in noise-insulating structural elements and is particularly intent upon incorporating these elements in assembly lines during manufacture of the vehicle.

2. Description of the Prior Art

For this purpose a hood for the engine chamber of a power vehicle is already known from European Patent B-111 430 where the inside of the hood is provided with a sound-absorbing packing. This packing is of suitable material, especially of compressed fiber material, and has rod-like formations which stand up from the hood when this packing is in assembled state. The hollow spaces which thus are formed between packing and hood have a sound-absorbing effect. This packing is self-supporting, i.e., is suitably compacted or compressed, and is heavy. The use of such self-supporting packings leads to undesirably heavy engine hoods and has all of the technical problems which are already known in the assembly phase of vehicle manufacture.

A noise-insulating covering element for the inside of an engine hood is also known from German DE-25 10 607, having several convexities, which together with the engine hood define an air-filled chamber, of which the dimensioning produces optimum acoustic absorption in the low and middle frequency ranges. This covering element is essentially self-supporting and is fastened to reinforcement ribs on the engine hood. Also, this structural part is not assembled until after the vehicle manufacture is completed and requires an undesirably rigid engine hood. For the security of the vehicle occupants, however, the goal of the modern vehicle industry is to construct the nose and rear parts as deformable wrinkle zones, i.e., with a variable rigidity corresponding to the expected forces.

Additional elements being attached thereto, for instance for sound insulation, thus require increased rigidity of the outside sheet and lead to undesirable higher weight.

OBJECTS AND SUMMARY OF THE INVENTION

Thus, a principal object of the present invention is to provide a structure which increases the sound-insulating effectiveness of conventional interconnected structural parts but without increasing the weight of the total composite part.

Another important object of the invention is to provide an improved sound-insulating device but without negatively influencing the rigidity in correspondence with the requirements.

Other objects and advantages of the invention will become readily apparent from the description which follows.

According to the invention a lightweight outer sheet having lower rigidity is joined to a specially structured, lightweight inside packing to form an inherently stable composite part.

The method for the production of a composite part of the present invention comprises the following steps:

In a first step, the prefabricated outside membrane blank part is cut and trimmed, the prefabricated inside packing provided with fastening elements is mounted, and is bonded with the outer sheet blank, the rough compound part is washed, rinsed and dried.

In a second step, a priming is applied and is annealed, lacquer is applied and is annealed.

In a third step, the protective film is removed.

The inside packing used for production of the composite part according to the invention is characterized essentially by various different compacted and shaped partial areas. Seemingly countersunk, shaped areas of flexible, acoustically effective composition form a considerable portion, while closely compacted areas are provided for the stability of the entire composite part. These closely compacted areas also have fin-shaped deformations and can include saucers filled with plastic, which serve for the fixing of holder elements.

To produce the composite part according to the invention, the inside packing is provided with a tear-off covering film, so that the acoustic properties of the inside packing are not negatively influenced during the dye treatment which may be carried out in an immersion bath.

In one preferred embodiment, super-light, fiber-reinforced plastics are used for the composite part, as are known to those skilled in modern autobody construction. Any decomposable or natural materials are suitable for this purpose, especially chitin-containing substances and resin mixtures with natural animal or vegetable fibers, such as, cotton fibers, banana fibers, etc. Cellulose fibers adhered together with decomposable or biodegradable synthetic resins are a particularly suitable composition for the inside packing.

The advantages of the composite part according to the invention as compared with conventional sound-insulating constructions are significant.

First, a composite part can be constructed in particular with maximum sound-insulation effectiveness along with simultaneous reduction of the weight. With the composite part according to the invention a wide range of rigidity—unknown until this time—is provided. Further advantages arise from the manufacture and assembly of the composite part. The assembly of the relatively heavy, loose and buckling sound-insulating mats is eliminated and the composite part together with the attached insulation packing can be immersed in the dye bath. This procedure is simplified by the inherent rigidity and is made possible by the placement of a protective film over the inside packing, since in the case of sound-insulating packings there is the traditional danger of contaminating the dye bath.

Another advantage of the composite part of the present invention resides in that the holder elements for fastening of the composite part are fixed directly into the inside packing, and are for instance hinge parts or fastening parts.

Not only is the production of the outer sheet thus considerably simplified, but also the holder elements integrated directly into the reinforcement zones obtain the required holding coefficient in the composite part.

In one preferred embodiment the inside packing provided with a decorative layer has a microorganism-repelling but nonetheless air-permeable reticulate layer beneath the decorative layer. This microporous reticulate layer for the most part protects the slightly compacted, acoustically, effective area from undesirable outside influences, such as temperature, air moisture, germ and fungus infestation, foreign odors, oils, fats, in other words contamination of all sorts.

Furthermore, the prefabricated inside packing includes a removable protective film, which lies only over the side of the inside packing provided with the decorative layer and during the final shaping/compacting stage can be sealed without any problem to the edge of the inside packing. The film is intended particularly so that the composite part is ready for assembly, while on the one hand the decorative layer and the acoustically effective areas are not bonded with the lacquer and, on the other hand, the dye bath is protected from contamination due to broken-off particles. This protective film is removed in a simple step following dye treatment.

BRIEF DESCRIPTION OF THE DRAWINGS

Hereinafter the invention is to be described in greater detail relative to one exemplary embodiment and with the aid of the drawings wherein.

DETAILED DESCRIPTION OF THE PREFERRED EMBODIMENTS

Figure 1:
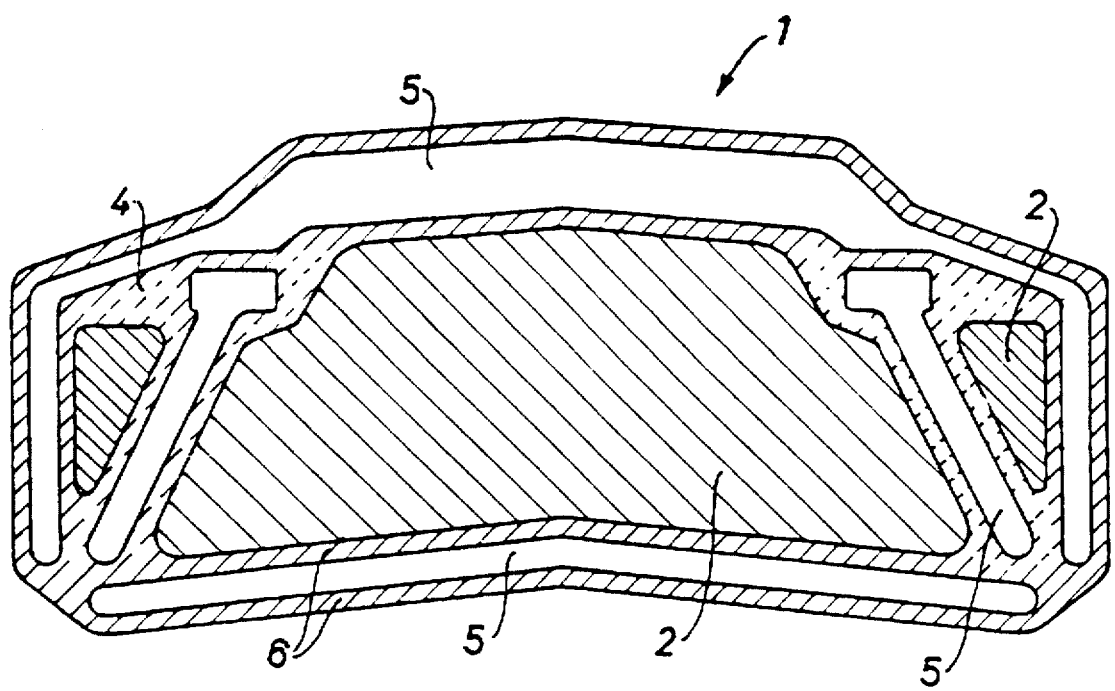
FIG. 1 is a diagrammatic plan view of an inside packing for an engine hood according to the present invention.

Referring now to the drawings wherein like numerals indicate like elements throughout the several views, the various proportioned areas of the inside packing 1 are shown diagrammatically in FIG. 1. The middle and acoustically effective main area consists of slightly compacted material and is formed to be as though countersunk. This deformation 2 is dimensioned to correspond to the acoustic requirements and together with the outer sheet 3 (FIG. 2) forms a Helmholtz resonator. It is to be understood that the side of inside packing 1 turned toward outer sheet 3 can incorporate additional depressions or dissipative structures, in order to adapt and to maximize the sound-insulating effect to the geometric factors. The areas outside the main area are more closely compacted and enhance the stability of the entire composite part. Especially these areas form a connected, solid supporting structure 4. According to this invention this stabilizing area has fin-like specifically shaped reinforcement zones 5 and highly compacted bonded zones 6. It is to be understood that these adhesive or bonded zones 6 extend to the edge of composite part 1. The other stabilizing areas are preferably cemented with the outside sheet. Thus the fin-like reinforcement zones 5 can be received just as well in the highly compacted areas as in the closely compacted portions.

Figure 2:
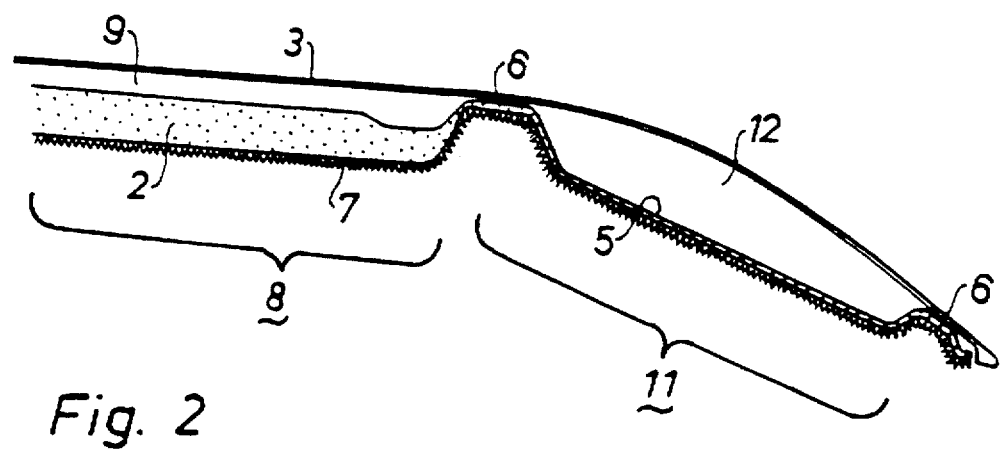
FIG. 2 is a diagrammatic transverse section through a composite element according to the present invention.

The stability required for use comes about first of all as a result of the combination of the inside packing with the outer sheet, as is shown in FIG. 2. The deformation 2 of inside packing 1 lying in the acoustically effective main area 8 and the hollow space 9 formed between this deformation 2 and outside sheet 3 are all clearly visible in the drawing. It is to be understood that these hollow spaces working as Helmholtz resonators are of dimensions corresponding to the frequency range to be absorbed. The stabilizing area 11 includes areas which serve on the one hand as reinforcement in support of the composite part and on the other hand as a connection to connect inside packing 1 with outside sheet 3. The hollow spaces 12 formed by fin-like reinforcement zones 5 likewise have a sound-damping effect and can house additional sound-dissipating structures.

In one preferred, particularly light embodiment, outer sheet 3 consists of a 2–3 mm thick sheet or film of thermosetting plastic material. Inside packing 1 in this embodiment is preferably made of cotton fleece, and phenolic resin having a surface weight of 1,200 g/m². A fiberglass mat including amino resins, of which the surface weight is approximately 250 g/m², is treated to be oil- and water-repellent. A double-layer film of polypropylene with a surface weight of 25 g/m² and of cellulose polyester with a surface weight of 23 g/m² is used as a removable protective film. The weight of a conventional engine hood is thus reduced from 15.5 kg to 7.5 kg by this invention.

The inside packing constructed in this manner is porous and thus especially suitable for its sound-absorbing function. For the main area 8 of inside packing 1 the packing is compacted to a density of approximately 160 kg/cm³. The closely compacted, stabilizing areas 11 are compacted to approximately 900 kg/cm³, while the highly compacted zones are compacted to approximately 1,200 kg/cm³.

Thus an inherently stable composite part can be formed, especially of two parts which ordinarily do not hold their shape, in other words, parts which are normally structurally unstable. In this invention it is possible to make a composite part which is not deformed by the mechanical loads expected to impact thereon.

Figure 3:
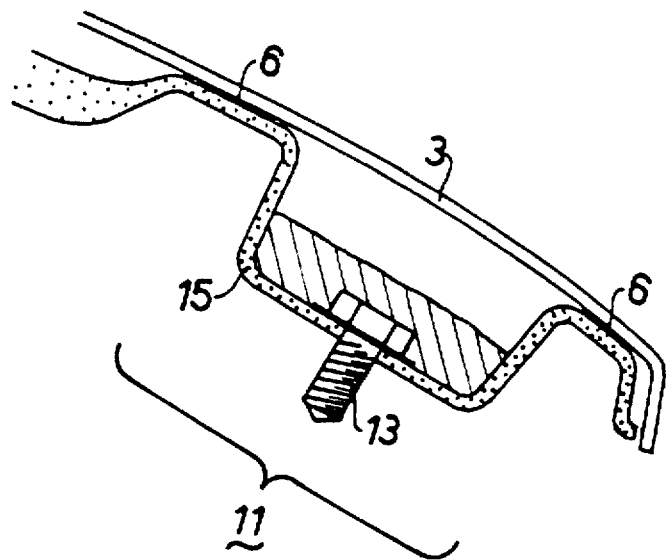
FIG. 3 is a diagrammatic transverse section through a composite element according to the present invention including a holder element.

FIG. 3 shows another detail of the composite part according to the invention which is constructed of an outer sheet 3 and an inside packing 1. In this embodiment the stabilizing area 11 has adhesive zones 6 and a saucer-shaped convexity 15, into which is glued a holder or fastening element 13, preferably a bolt or an anchor for a hinge.

A two-component adhesive under the commercial name of THEROSON 6026 was used in this preferred embodiment. A break-resistance of higher than 30 daN/cm² was thus attained.

The reinforcement and bonding or adhesive zones could be arranged and dimensioned by one skilled in the art in such a manner that the composite element has a maximum sound-absorbing effectiveness and also has the required rigidity.

Figure 4:
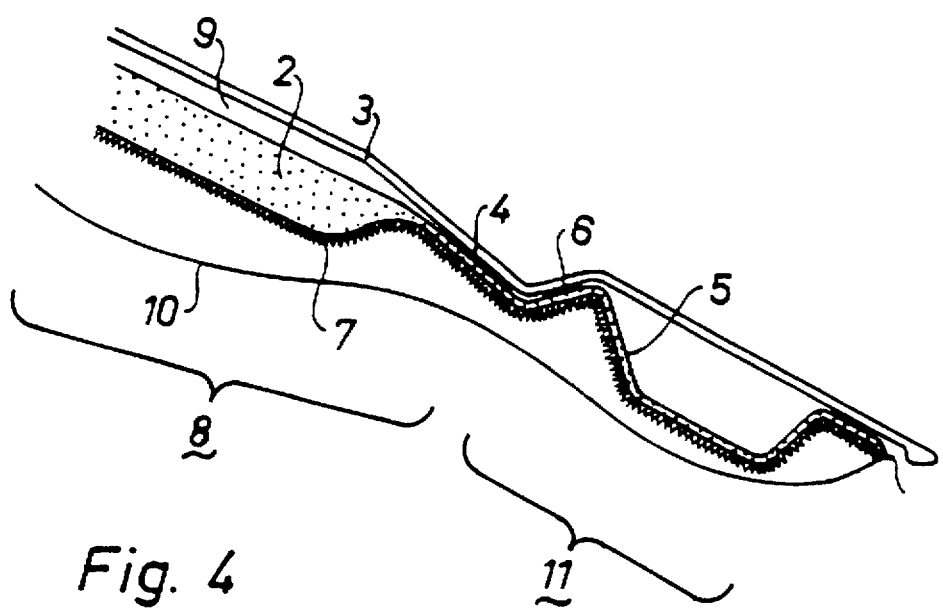
FIG. 4 is a diagrammatic transverse section through a composite element according to the present invention with an inside packing adapted to the shape of the outer sheet.

FIG. 4 shows another construction of the composite element according to the invention. It clearly shows that the construction of the composite element allows for absolutely arbitrary shaping of the outside sheet. In particular, concave or convex shapes of the outside sheet could be joined with the inside packing without any problem. Without any additional technical expertise, other supporting systems 4 could be formed in the inside packing, to which the outside sheet 3 is cemented. Suitable cements have long been known to those skilled in the art.

In one further configuration of inside packing 1, a porous reticulate layer is mounted between the decorative layer 7 and the fiber mat. This reticulate layer prevents the penetration of microorganisms. Such reticulate layers have long been known in the art and need not be described here in greater detail.

A protective film 10 which completely surrounds the decorative layer and protects the composite part from outside influences, especially during dye treatment, is of particular importance for low-cost production of the composite part according to the invention. For industrial manufacture, this film is provided with tear strips in order to facilitate its removal in a simple manner.

The advantages of this protective film lie especially in that the film is not mounted on the surface but rather is welded to the edge zones of the inside packing. Thus all aspects of the outside surface remain unaffected, such as for instance by modification of the shine, streaks, adhesive residues, etc. With application of the film during the shaping/compression procedure, the fastening of this film to the inside packing is greatly simplified in its technical method and even the stripping-off force required for removal of the film can be regulated in a simple manner.

In another configuration, the inside packing under the protective film also includes an aluminum foil, in order to preserve the acoustically effective fiber fleece from possible thermal damage during storage or conveyance.

Other configurations of the composite part according to the invention lie within the knowledge of those skilled in the art. Thus for instance instead of the protective film and the additional aluminum foil, one single aluminum-coated plastic foil could be used.

It is to be understood that only suitable plastics are used in consideration of the recycleability of the composite part and in particular even the holding elements fixed in the inside packing are to consist of decomposable plastics.

The aforementioned composite part can be used in motor powered vehicles as well as in construction or industrial machines which have intolerable noise sources.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. Method for the production of an inherently stable self-supporting composite part for engine hoods for acoustic screening of noise sources, comprising the steps of:

a. cutting and trimming a prefabricated outer membrane blank part to form an outside sheet;

b. providing a prefabricated inside packing with fastening elements for fastening components to said inside packing, and providing said inside packing with a removable protective film attached to an exposed surface of said inside packing;

c. bonding the outside sheet directly to said inside packing, said outside sheet and said inside packing cooperating to form a self-supporting structure independent of the engine hood;

d. applying a primer to at least a portion of the outside sheet of the self-supporting structure formed in step c; and e. applying a lacquer to the primer; and removing the protective film.

* * * * *